United States Patent
Duggan et al.

(10) Patent No.: US 6,261,183 B1
(45) Date of Patent: Jul. 17, 2001

(54) DRIVESHAFT TUBE AND UNIVERSAL JOINT ASSEMBLY AND METHOD OF MANUFACTURING SAME

(75) Inventors: James A. Duggan, Temperance, MI (US); Ray A. Gall, Curtice, OH (US); Andrew L. Nieman, Lambertville, MI (US)

(73) Assignee: Dana Corporation, Toledo, OH (US)

( * ) Notice: Subject to any disclaimer, the term of this patent is extended or adjusted under 35 U.S.C. 154(b) by 0 days.

(21) Appl. No.: 09/476,474

(22) Filed: Dec. 30, 1999

Related U.S. Application Data

(60) Provisional application No. 60/114,445, filed on Dec. 31, 1998.

(51) Int. Cl.$^7$ ........................................... F16D 3/16
(52) U.S. Cl. ............................ 464/134; 464/136; 29/516
(58) Field of Search .................................. 464/106, 120, 464/134, 135, 136; 403/274; 29/505, 515, 516, 525

(56) References Cited

U.S. PATENT DOCUMENTS

| | | | |
|---|---|---|---|
| 97,575 | * 12/1869 | Wheeler | 464/136 |
| 135,404 | * 2/1873 | Cathcart | 464/136 X |
| 272,339 | * 2/1883 | Shuman | 464/136 |
| 1,389,422 | 8/1921 | Curtis . | |
| 2,395,792 | 2/1946 | Shea . | |
| 2,447,881 | * 8/1948 | Warner | 464/135 X |
| 2,952,999 | 9/1960 | Glover . | |
| 3,574,277 | * 4/1971 | Paine et al. | 464/136 X |
| 5,314,380 | 5/1994 | Yamamoto . | |
| 5,579,661 | 12/1996 | Yarnell et al. . | |
| 6,162,126 | * 12/2000 | Barrett et al. | 464/134 |

FOREIGN PATENT DOCUMENTS

| | | | |
|---|---|---|---|
| 2 135 425 | * 8/1984 | (GB) | 464/136 |

\* cited by examiner

Primary Examiner—Lynne H. Browne
Assistant Examiner—Greg Binda
(74) Attorney, Agent, or Firm—MacMillan, Sobanski & Todd, LLC

(57) ABSTRACT

A driveshaft assembly includes a universal joint and a driveshaft tube. The universal joint includes a hollow journal and bearing carrier that is adapted to support a cross having a plurality of outwardly extending trunnions therein. In a first embodiment, the universal joint is assembled by initially disposing a pair of bearing supports loosely about a first pair of opposed trunnions of the cross. Next, the cross and the bearing supports are inserted within the carrier. The bearing supports are preferably sized to fit snugly within the carrier. Then, bearing cups are inserted through openings formed through upper and lower panels of the carrier and through openings formed through the bearing supports onto the opposed trunnions of the cross. The carrier and the cross are then connected to the driveshaft tube by moving them axially such that the carrier is received within opposed channel regions provided in a pair of arms formed in an end portion of the driveshaft tube. Lastly, the outermost ends of the arms of the end portion are bent inwardly toward one another to enclose portions of the carrier therein. The bent ends of the arms function to positively retain the universal joint within the end portion of the driveshaft tube.

12 Claims, 10 Drawing Sheets

DRIVESHAFT TUBE AND UNIVERSAL JOINT ASSEMBLY AND METHOD OF MANUFACTURING SAME

CROSS REFERENCE TO RELATED APPLICATION

This application claims the benefit of United States Provisional Application No. 60/114,445, filed Dec. 31, 1998, the disclosure of which is incorporated herein by reference.

BACKGROUND OF THE INVENTION

This invention relates to a vehicle driveshaft assembly and a method for its manufacture. More specifically, this invention relates to a driveshaft assembly including a driveshaft tube having a pair of opposed lug cars formed integrally therein that are configured to support a universal joint assembly therein. The universal joint assembly includes a journal and bearing carrier that is formed from a rectangular tube section or two separate stampings and a pair of bearing supports that are inserted into the journal and bearing carrier. The invention also relates to a method of manufacturing such a driveshaft assembly.

In most land vehicles in use today, a drive train assembly is provided for transmitting rotational power from an output shaft of an transmission to an input shaft of an axle assembly so as to rotatably drive one or more wheels of the vehicle. To accomplish this, a typical vehicular drive train assembly includes a hollow cylindrical driveshaft tube. A first universal joint is connected between the output shaft of the transmission and a first end of the driveshaft tube, while a second universal joint is connected between a second end of the driveshaft tube and the input shaft of the axle assembly. The universal joints provide a rotational driving connection from the output shaft of the transmission through the driveshaft tube to the input shaft of the axle assembly, while accommodating a limited amount of angular misalignment between the rotational axes of these three shafts.

A typical universal joint includes a cross having a central body portion with four cylindrical trunnions extending outwardly therefrom. The trunnions are oriented in a single plane and extend at right angles relative to one another. A hollow cylindrical bearing cup having a cylindrical outer wall and a circular end wall is mounted on the end of each of the trunnions. A bearing structure, such as a plurality of needle bearings or roller bearings, is provided between the trunnion and the associated bearing cup to facilitate relative rotational movement therebetween. The bearing cups that are mounted on a first opposed pair of the trunnions can be connected to a first yoke secured to a first component of the drive train assembly, while the bearing cups mounted on a second opposed pair of the trunnions can be connected to a second yoke secured to a second component of the drive shaft assembly.

Traditionally, the ends of the driveshaft tube are connected to the universal joints by respective tube yokes. A typical tube yoke includes a sleeve portion that is sized to be press fit within the end of the driveshaft tube. The sleeve portion of the tube yoke is usually permanently secured to the end of the driveshaft tube, such as by welding, adhesives, and the like. The tube yoke further includes a yoke portion having a pair of opposed arms extending therefrom. The opposed arms of the yoke portion are adapted to receive the opposed bearing cups provided on the universal joint cross in the manner described above. Although this general structure has been in common use for many years, it would be desirable to provide an improved structure for a driveshaft assembly that is simpler and less expensive than known structures.

SUMMARY OF THE INVENTION

This invention relates to several improved structures for a driveshaft assembly and a method of manufacturing same. The driveshaft assembly includes a universal joint and a driveshaft tube. The universal joint includes a hollow journal and bearing carrier that is adapted to support a cross having a plurality of outwardly extending trunnions therein. In a first embodiment, the universal joint is assembled by initially disposing a pair of bearing supports loosely about a first pair of opposed trunnions of the cross. Next, the cross and the bearing supports are inserted within the carrier. The bearing supports are preferably sized to fit snugly within the carrier. Then, bearing cups are inserted through openings formed through upper and lower panels of the carrier and through openings formed through the bearing supports onto the opposed trunnions of the cross. The carrier and the cross are then connected to the driveshaft tube by moving them axially such that the carrier is received within opposed channel regions provided in a pair of arms formed in an end portion of the driveshaft tube. Lastly, the outermost ends of the arms of the end portion are bent inwardly toward one another to enclose portions of the carrier therein. The bent ends of the arms function to positively retain the universal joint within the end portion of the driveshaft tube.

Various objects and advantages of this invention will become apparent to those skilled in the art from the following detailed description of the preferred embodiments, when read in light of the accompanying drawings.

DETAILED DESCRIPTION OF THE PREFERRED EMBODIMENTS

Figure 1:
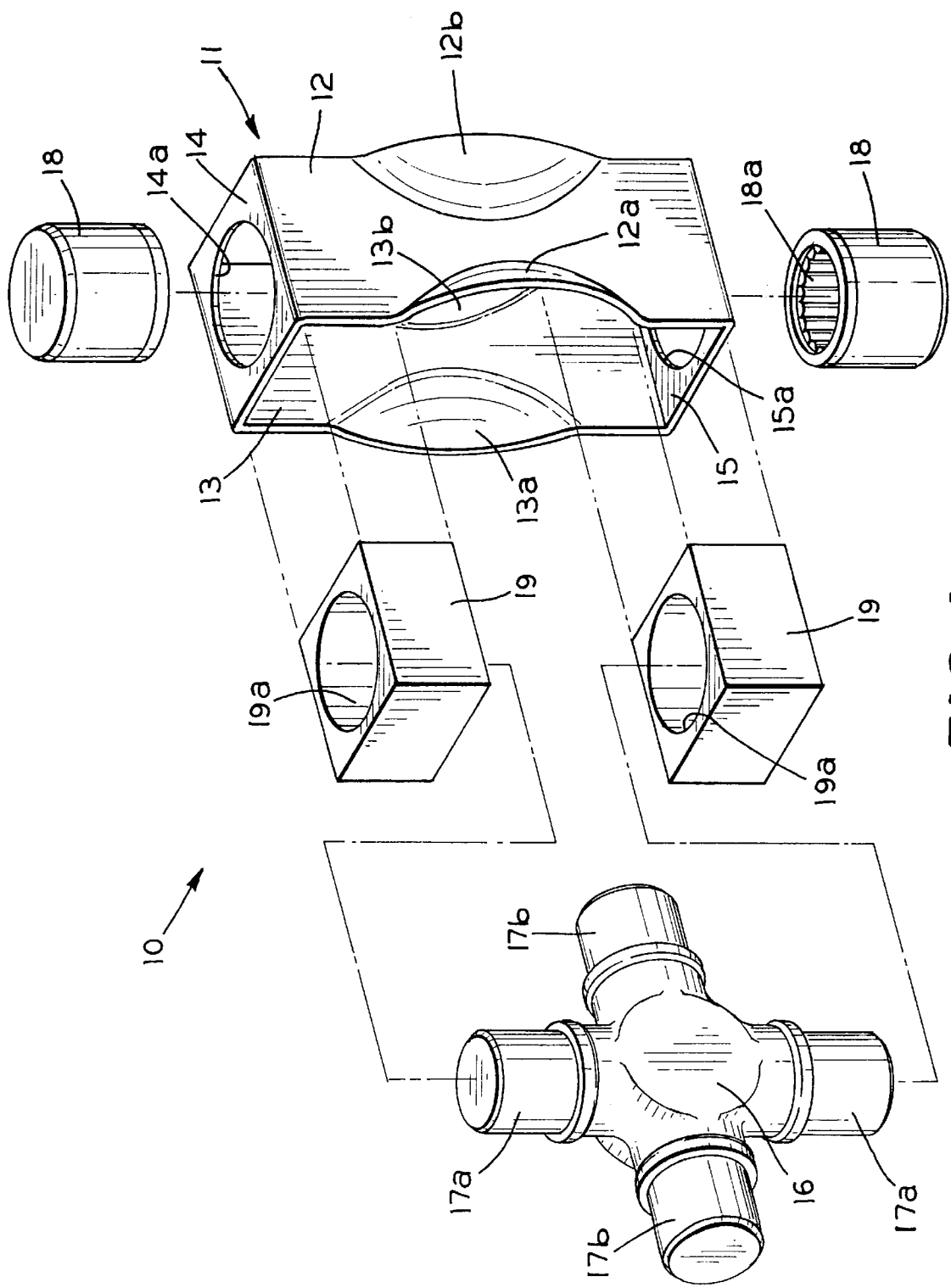
FIG. 1 is an exploded perspective view of a first embodiment of a universal joint for use with a driveshaft tube in accordance with this invention.

Referring now to the drawings, there is illustrated in FIG. 1 a first embodiment of a universal joint, indicated generally at 10, for use with a driveshaft tube in accordance with this invention. The universal joint 10 includes a journal and bearing carrier, indicated generally at 11, that is hollow in shape. In the illustrated embodiment, the carrier 11 is formed from a section of hollow rectangular tubing including a pair of side panels 12 and 13 having upper and lower end panels 14 and 15 extending therebetween. However, the carrier 11 may be formed having any desired shape. Furthermore, the carrier 11 may be formed from two or more pieces of material that are connected together in any known manner, such as two separate U-shaped stampings joined together that are welded together. The side panels 12 and 13 may have respective pairs of concave expanded portions 12a, 12b and 13a, 13b formed therein for a purpose that will be explained below. The end panels 14 and 15 have respective openings 14a and 15a formed therethrough for a purpose that will also be explained below.

The universal joint 10 also includes a cross 16 having a central body portion with four cylindrical trunnions 17a and 17b extending outwardly therefrom. The trunnions 17a and 17b are oriented in a single plane and extend at right angles relative to one another. A first pair of bearing cups 18 is adapted to be mounted on the ends of a first opposed pair of the trunnions 17a. Each of the bearing cups 18 is generally hollow and cylindrical in shape, having a closed outer end wall. A bearing structure, such as a plurality of needle bearings or roller bearings 18a, is provided between each of the trunnions 17a and the associated bearing cups 18 to facilitate relative rotational movement therebetween. A second pair of bearing cups (not shown) is adapted to be mounted on the ends of a second opposed pair of the trunnions 17b in a similar manner. The second pair of bearing cups are adapted to be connected to a conventional yoke (not shown) or other structure to connect the universal joint 10 to another component of a driveshaft assembly.

Figure 2:
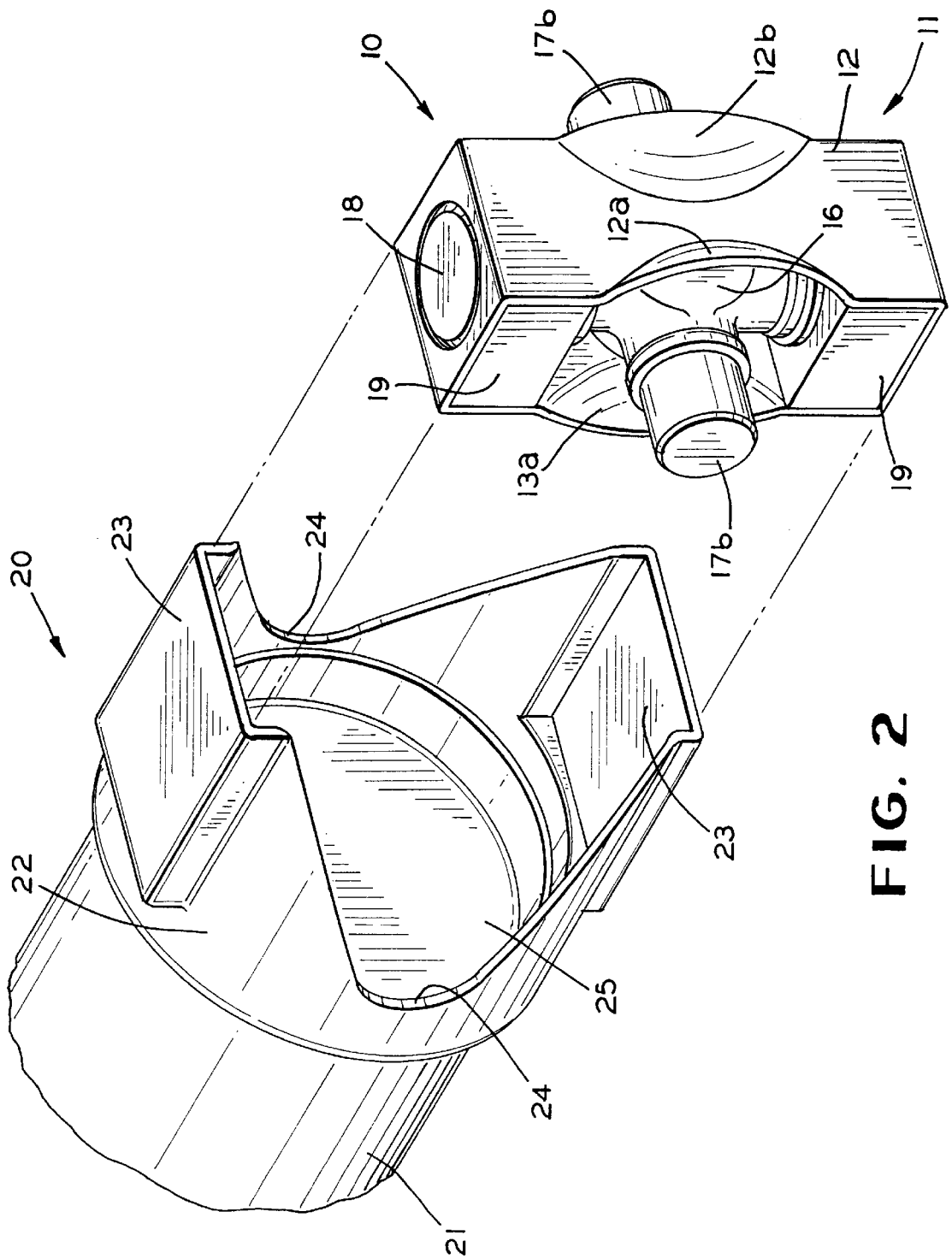
FIG. 2 is a perspective view of the universal joint illustrated in FIG. 1 shown assembled, and further showing an end of the driveshaft tube to be connected thereto.

The universal joint 10 further includes a pair of bearing supports 19. Each of the bearing supports 19 is formed generally in the shape of a rectangular block having an outer shape that corresponds generally to the inner shape of the journal and bearing carrier 11. Thus, the bearing supports 19 are sized to be received snugly within the carrier 11 as shown in FIG. 2. An opening 19a is formed through each of the bearing supports 19. As will be explained in greater detail below, the openings 19a are sized to snugly receive the bearing cups 18 therein.

The universal joint 10 is assembled by initially disposing the bearing supports 19 about the first pair of the trunnions 17a of the cross 16. The inner diameters defined by the openings 19a formed through bearing supports 19 are somewhat larger that the outer diameters of the trunnions 17a. Thus, the bearing supports 19 are received about the trunnions 17a with play. Next, the cross 16 and the bearing supports 19 are inserted within the journal and cross carrier 11. This can be accomplished by aligning the sides of the bearing supports 19 with the inner surfaces of the carrier 11 and moving the cross 16 and the bearing supports 19 laterally therein. As mentioned above, the bearing supports 19 are preferably sized to fit snugly within the carrier 11. Thus, a conventional press or other assembly tool may be needed to insert the cross 16 and the bearing supports 19 within the carrier 11. Finally, the bearing cups 18 are inserted through the openings 19a formed through the bearing supports 19 and onto the opposed trunnions 17a. Again, as mentioned above, the bearing cups 18 are preferably sized to fit snugly within the bearing supports 19. Thus, a conventional press or other assembly tool may be needed to insert the bearing cups 18 within the bearing supports 19.

The assembled universal joint 10 is clearly illustrated in FIG. 2. As shown therein, the bearing cups 18 are frictionally retained in the bearing supports 19, and the bearing supports 19 are frictionally retained within the journal and bearing carrier 11. However, it will be appreciated that such frictional engagements are not required. If desired, additional retaining structures (not shown) may be provided to positively retain the bearing cups 18 within the bearing supports 19 or to positively retain the bearing supports 19 within the carrier 11. The cross 16, however, is free to rotate a limited distance relative to the bearing cups 18, the bearing supports 19, and the carrier 11 by virtue of the bearing structures 19a discussed above. The concave expanded portions 12a, 12b and 13a, 13b are provided in the side panels 12 and 13, respectively, to prevent interference with such relative rotation. The side panels 12 and 13 may, if desired, be formed having cut-out portions in lieu of the concave expanded portions 12a, 12b and 13a, 13b for the same purpose. However, the concave expanded portions 12a, 12b and 13a, 13b are preferred because they desirably maintain the rigidity of the carrier 11.

FIG. 2 also shows a driveshaft tube, indicated generally at 20, that is adapted for use with the universal joint 10 described above. As shown therein, the driveshaft tube 20 includes a generally hollow cylindrical body portion 21 having an enlarged end portion 22 formed integrally therewith. Preferably, the end portion 22 of the driveshaft tube 20 is shaped to form or is otherwise provided with first and second internally stepped shoulders 22a and 22b (see FIG. 3) formed therein for a purpose that will be explained below. The end portion 22 has a pair of axially extending, opposed arms 23 that are defined by a pair of generally V-shaped cut-outs 24. The illustrated arms 23 have generally U-shaped cross sections defining a pair of inwardly facing channel regions. The purpose for these channel regions will be described below.

A welch plug 25 or other closure device is disposed within the end portion 22 of the driveshaft tube 20. The welch plug 25 is preferably sized to fit snugly within the end portion 22 of the driveshaft tube 20 and can be installed by moving axially within such end portion 22 until it abuts the first internally stepped shoulder 22a mentioned above. The welch plug 25 is provided to seal the interior of the body portion 21 of the driveshaft tube to prevent water and other contaminants from entering therein. The welch plug 25 may also provide desirable stiffness and rigidity for the end portion 22 of the driveshaft 20 and support for the arms 23 extending therefrom.

Figure 3:
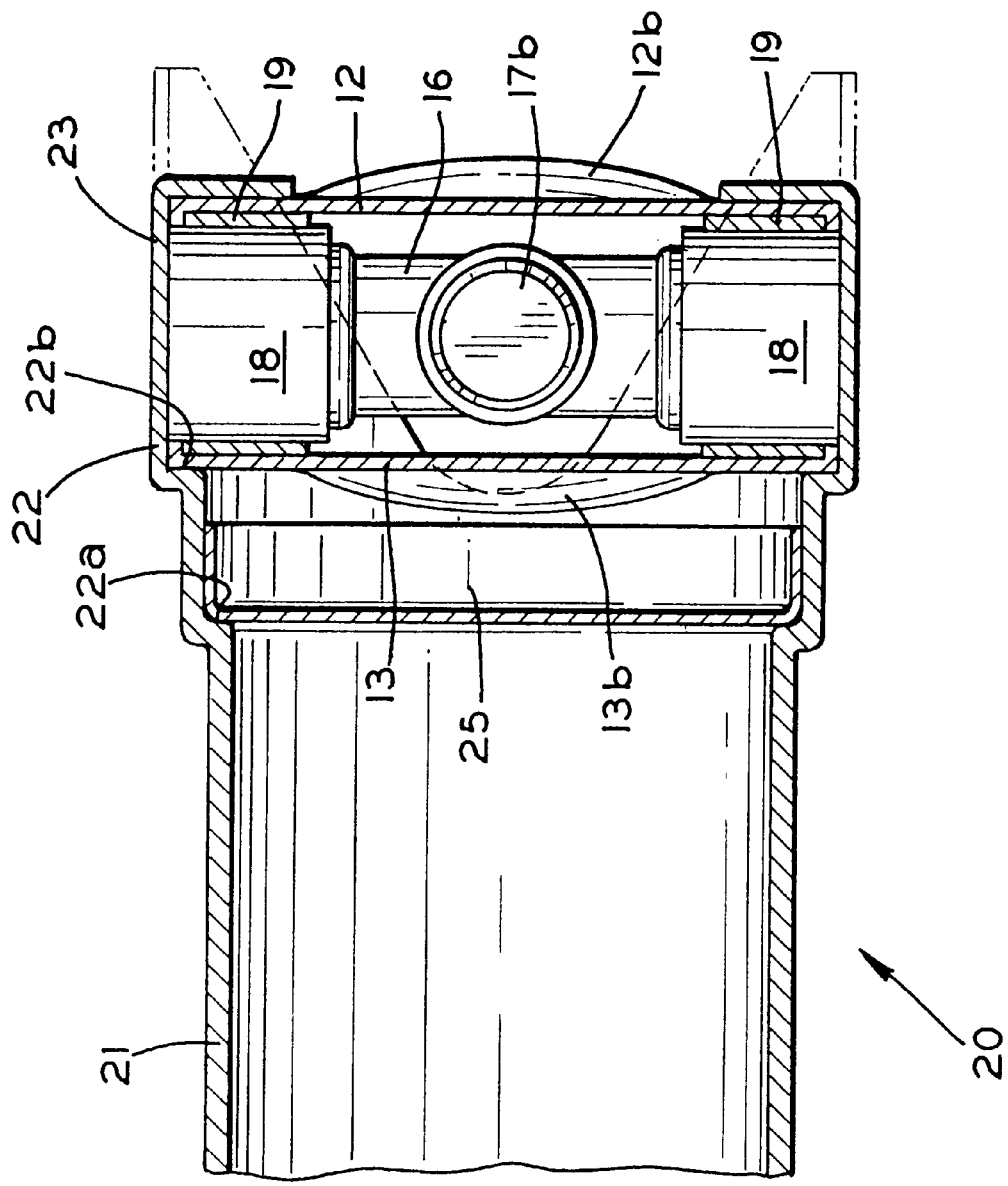
FIG. 3 is sectional elevational view of the universal joint and driveshaft tube illustrated in FIG. 2 shown assembled.

The universal joint 10 is connected to the driveshaft tube 20 by moving it axially as shown in FIG. 2 such that the journal and bearing carrier 11 is received within the opposed channel regions of the arms 23 of the end portion 22, as shown in FIG. 3. The carrier 11 is preferably sized to fit snugly between the arms 23 of the driveshaft tube 20. Thus, a conventional press or other assembly tool may be needed to insert the universal joint 10 within the end portion 22 of the driveshaft tube 20. As shown in FIG. 3, the carrier 11 is moved axially within the end portion 22 of the driveshaft tube 20 until it abuts the second internally stepped shoulder 22b mentioned above. Then, the outermost ends of the arms 23 of the end portion 22 are bent from their original axially extending positions (illustrated in dotted lines in FIG. 3) inwardly toward one another to enclose portions of the carrier 11 therein. A conventional press or other assembly tool may be needed to perform this bending operation. Regardless, the bent arms 23 function to positively retain the universal joint 10 within the end portion 22 of the driveshaft tube 20. Thus, the universal joint 10 is connected to the driveshaft tube 20 for operation in a normal manner.

Any appropriate materials may be used for both the driveshaft tube 20 and the other components of the universal joint 10. The use of steel, aluminum, magnesium, and alloys of these materials, as well as composite materials, are all within the scope of the invention. Of course, none of the materials need be used exclusively, and their combination is specifically included.

Figure 4:
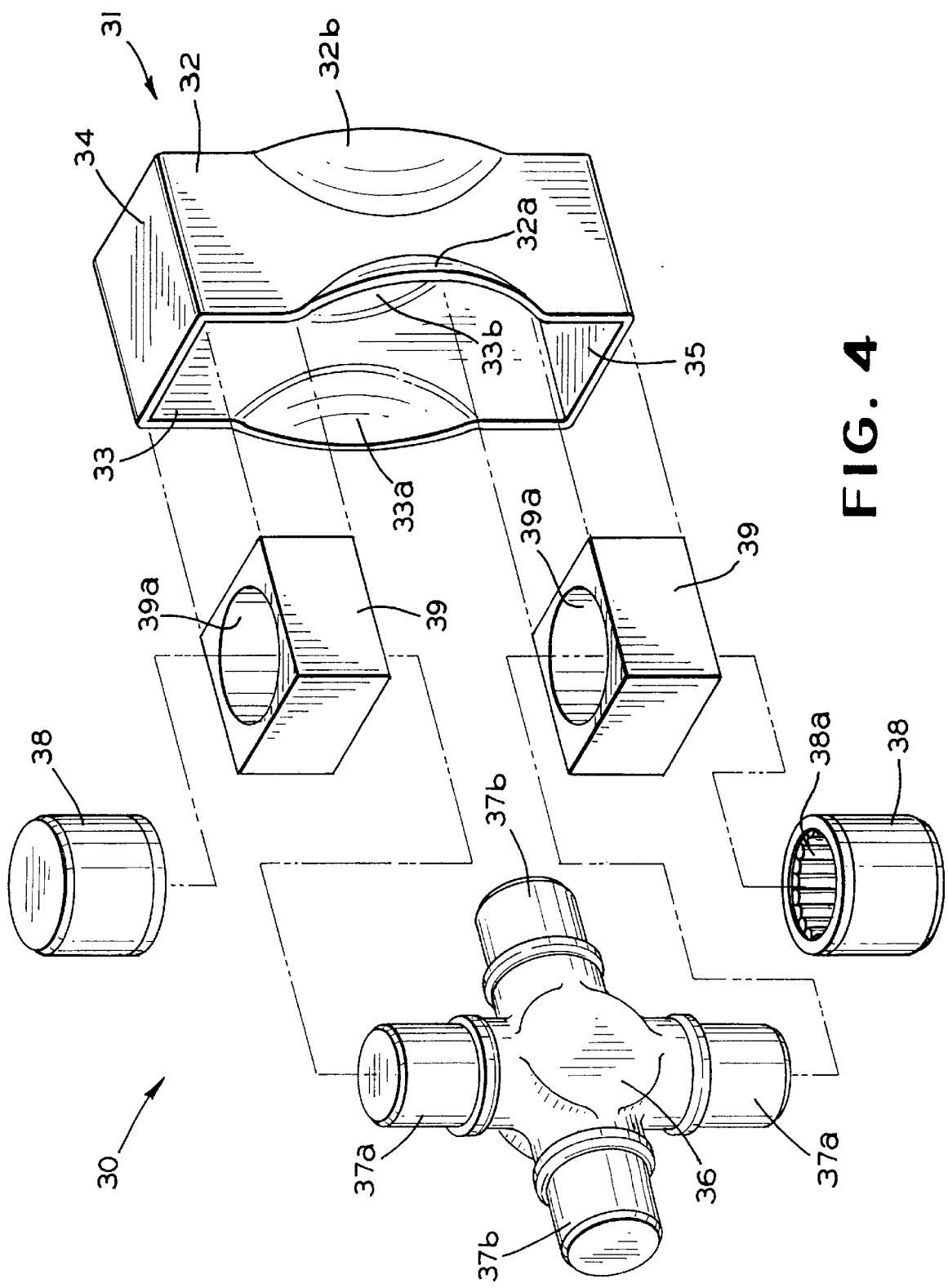
FIG. 4 is an exploded perspective view of a second embodiment of a universal joint for use with a driveshaft tube in accordance with this invention.
Figure 5:
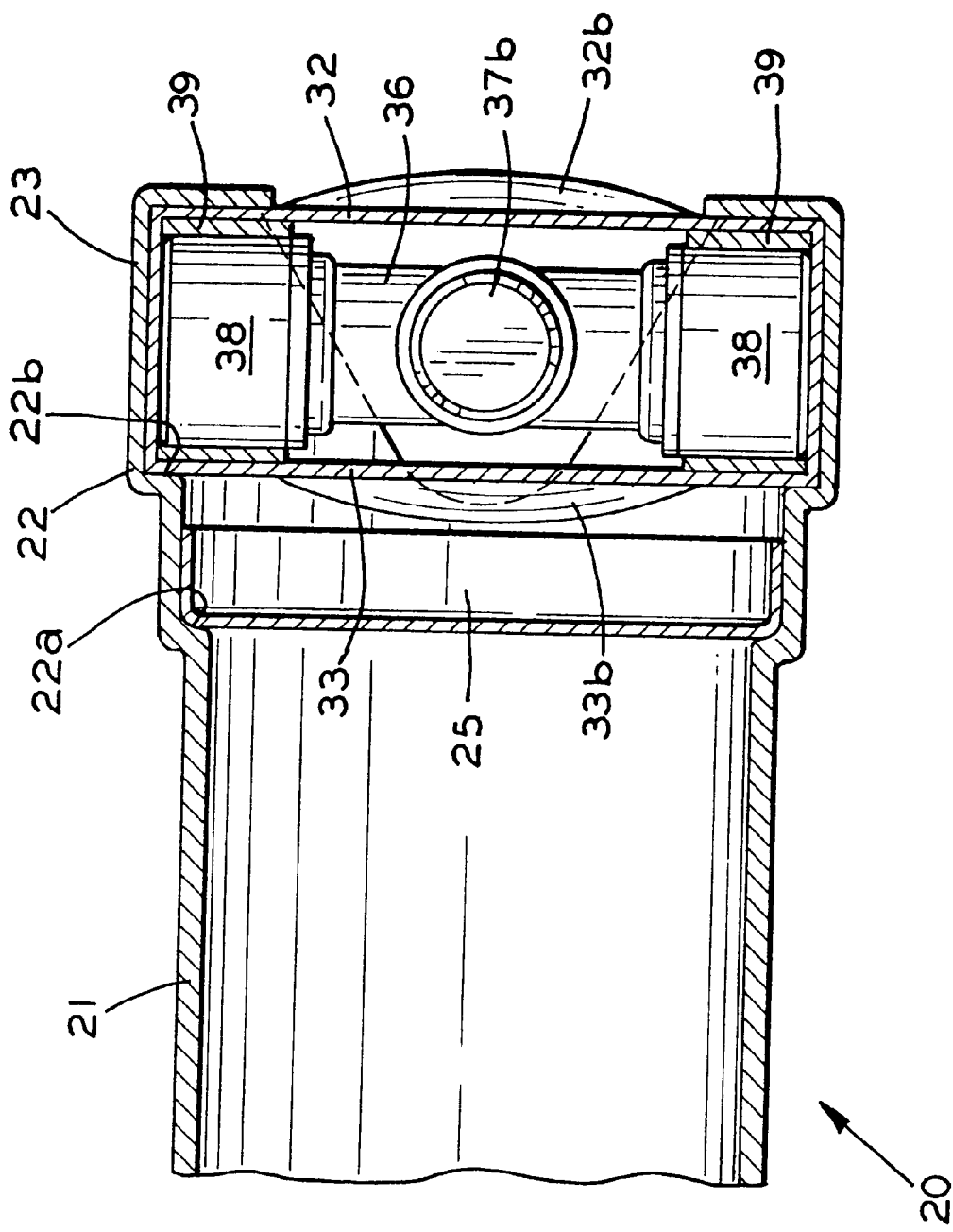
FIG. 5 is sectional elevational view of the universal joint illustrated in FIG. 4 shown assembled with the end of the driveshaft tube illustrated in FIGS. 2 and 3.

Referring now to FIGS. 4 and 5, there is illustrated a second embodiment of a universal joint, indicated generally at 30, for use with the driveshaft tube 20 in accordance with this invention. The universal joint 30 includes a journal and bearing carrier, indicated generally at 31, that is hollow in shape. In the illustrated embodiment, the carrier 31 is formed from a section of hollow rectangular tubing having a pair of side panels 32 and 33 having upper and lower end panels 34 and 35 extending therebetween. However, the carrier 31 may be formed having any desired shape. Furthermore, the carrier 31 may be formed from two or more pieces of material that are connected together in any known manner, such as two separate U-shaped stampings joined together that are welded together. The side panels 32 and 33 may have respective pairs of concave expanded portions 32a, 32b and 33a, 33b formed therein for the same purpose as described above. However, unlike the carrier 11 described above, the end panels 34 and 35 have no openings formed therethrough.

The universal joint 30 also includes a cross 36 having a central body portion with four cylindrical trunnions 37a and 37b extending outwardly therefrom. The trunnions 37a and 37b are oriented in a single plane and extend at right angles relative to one another. A first pair of bearing cups 38 is adapted to be mounted on the ends of a first opposed pair of the trunnions 37a. Each of the bearing cups 38 is generally hollow and cylindrical in shape, having a closed outer end wall. A bearing structure, such as a plurality of needle bearings or roller bearings 38a, is provided between each of the trunnions 37a and the associated bearing cups 38 to facilitate relative rotational movement therebetween. A second pair of bearing cups (not shown) is adapted to be mounted on the ends of a second opposed pair of the trunnions 37b in a similar manner. The second pair of bearing cups are adapted to be connected to a conventional yoke (not shown) to connect the universal joint 30 to another component of a driveshaft assembly.

The universal joint 30 further includes a pair of bearing supports 39. Each of the bearing supports 39 is formed generally in the shape of a block having an outer shape that corresponds generally to the inner shape of the journal and bearing carrier 31. Thus, the bearing supports 39 are sized to be received snugly within the carrier 31 as shown in FIG. 5. An opening 39a is formed through each of the bearing supports 39. As described above, the openings 39a are sized to snugly receive the bearing cups 38 therein.

The universal joint 30 is assembled by initially inserting the bearing cups 38 through the openings 39a formed through the bearing supports 39. As described above, the bearing cups 38 are preferably sized to fit snugly within the bearing supports 39. Thus, a conventional press or other assembly tool may be needed to insert the bearing cups 38 within the bearing supports 39. Then, the bearing cups 38 and the bearing supports 39 are disposed about the first pair of the trunnions 37a of the cross 36. If desired, the bearing cups 38 may initially be installed on the trunnions 37a, and then the bearing supports 39 can be installed on the bearing cups 38. Regardless, the cross 36, the bearing cups 38, and the bearing supports 39 are next inserted within the journal and cross carrier 31. This can be accomplished by aligning the sides of the bearing supports 39 with the inner surfaces of the carrier 31 and moving the cross 36 and the bearing supports 39 laterally therein. As mentioned above, the bearing supports 39 are preferably sized to fit snugly within the carrier 31. Thus, a conventional press or other assembly tool may be needed to insert the cross 36 and the bearing supports 39 within the carrier 31. The assembled universal joint 30 is clearly illustrated in FIG. 5. As shown therein, the bearing cups 38 are frictionally retained in the bearing supports 39, and the bearing supports 39 are frictionally retained within the journal and bearing carrier 31. The universal joint 30 is connected to the driveshaft tube 20 in the same manner as described above and functions in the same manner.

Figure 6:
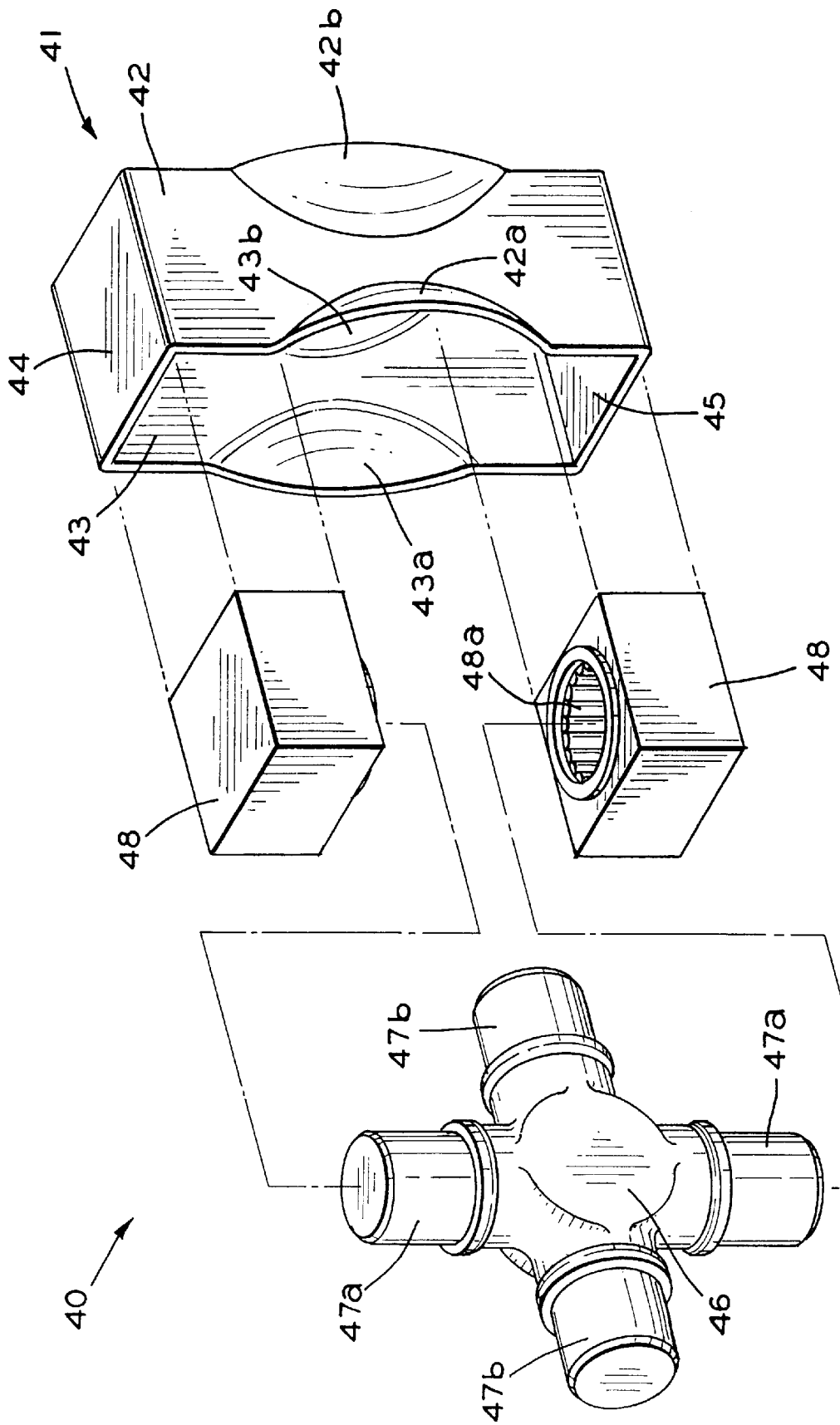
FIG. 6 is an exploded perspective view of a third embodiment of a universal joint for use with a driveshaft tube in accordance with this invention.
Figure 7:
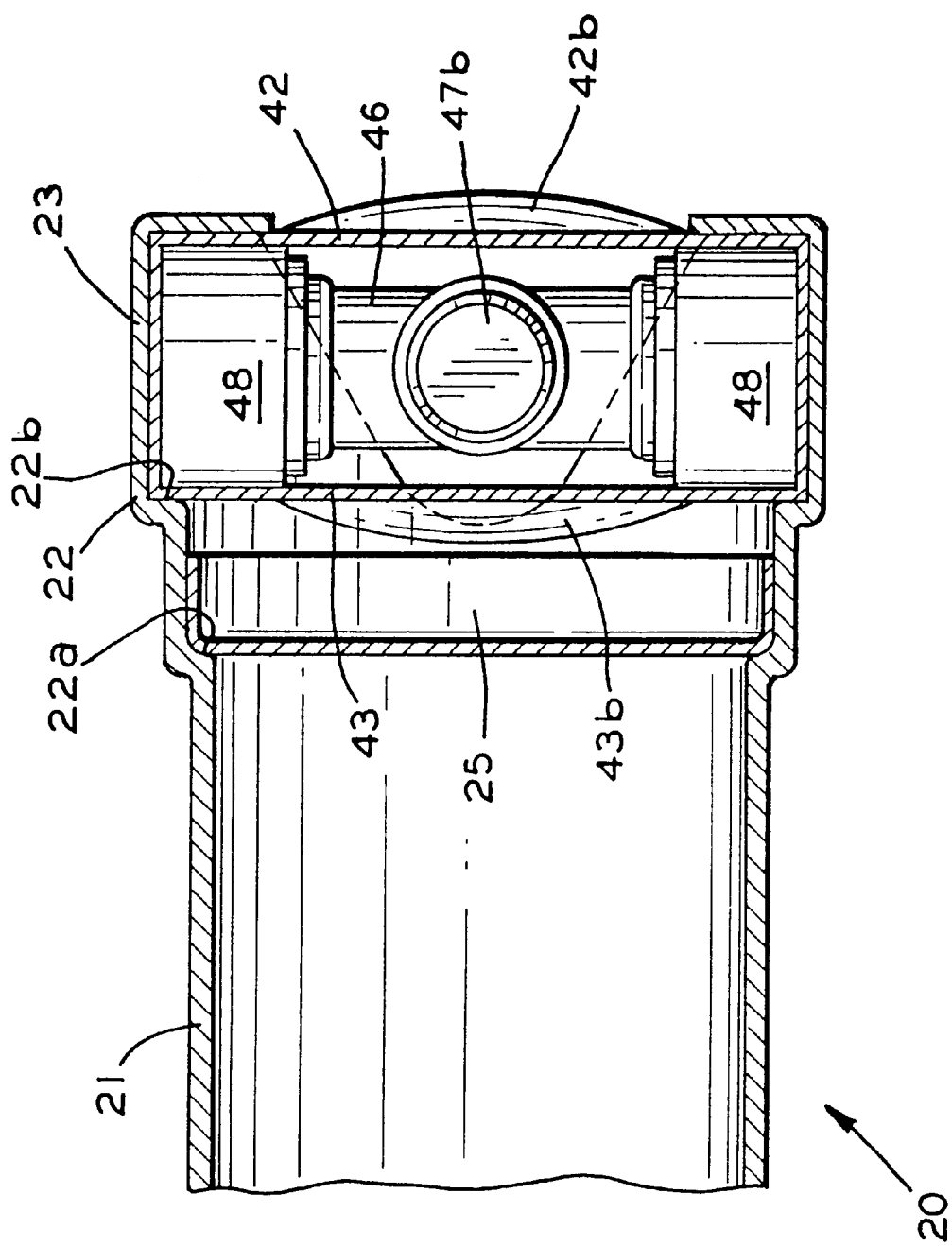
FIG. 7 is sectional elevational view of the universal joint illustrated in FIG. 6 shown assembled with the end of the driveshaft tube illustrated in FIGS. 2 and 3.

Referring now to FIGS. 6 and 7, there is illustrated a third embodiment of a universal joint, indicated generally at 40, for use with the driveshaft tube 20 in accordance with this invention. The universal joint 40 includes a journal and bearing carrier, indicated generally at 41, that is hollow in shape. In the illustrated embodiment, the carrier 41 is formed from a section of hollow rectangular tubing having a pair of side panels 42 and 43 having upper and lower end panels 44 and 45 extending therebetween. However, the carrier 41 may be formed having any desired shape. Furthermore, the carrier 41 may be formed from two or more pieces of material that are connected together in any known manner, such as two separate U-shaped stampings joined together that are welded together. The side panels 42 and 43 may have respective pairs of concave expanded portions 42a, 42b and 43a, 43b formed therein for the same purpose as described above. However, unlike the carrier 11 described above, the end panels 44 and 45 have no openings formed therethrough.

The universal joint 40 also includes a cross 46 having a central body portion with four cylindrical trunnions 47a and 47b extending outwardly therefrom. The trunnions 47a and 47b are oriented in a single plane and extend at right angles relative to one another. A first pair of bearing support cups 48 is adapted to be mounted on the ends of a first opposed pair of the trunnions 47a. Each of the bearing support cups 48 is formed generally in the shape of a block having an outer shape that corresponds generally to the inner shape of the journal and bearing carrier 41. Thus, the bearing support cups 48 are sized to be received snugly within the carrier 41 as shown in FIG. 7. Each of the bearing support cups 48 further has a generally hollow and cylindrical opening formed therein that terminates in a closed outer end wall. A bearing structure, such as a plurality of needle bearings or roller bearings 48a, is provided between each of the trunnions 47a and the associated bearing support cups 48 to facilitate relative rotational movement therebetween. A second pair of traditional bearing cups (not shown) is adapted to be mounted on the ends of a second opposed pair of the trunnions 47b in a similar manner. The second pair of bearing cups are adapted to be connected to a conventional yoke (not shown) to connect the universal joint 40 to another component of a driveshaft assembly.

The universal joint 40 is assembled by initially inserting the bearing support cups 48 about the first pair of the trunnions 47a of the cross 46. The cross 46 and the bearing support cups 48 are next inserted within the journal and bearing carrier 41. This can be accomplished by aligning the sides of the bearing support cups 48 with the inner surfaces of the carrier 41 and moving the cross 46 and the bearing support cups 48 laterally therein. As mentioned above, the bearing support cups 48 are preferably sized to fit snugly within the carrier 41. Thus, a conventional press or other assembly tool may be needed to insert the cross 46 and the bearing support cups 48 within the carrier 41. The assembled universal joint 40 is clearly illustrated in FIG. 5. As shown therein, the bearing support cups 48 are frictionally retained within the journal and bearing carrier 41. The universal joint 40 is connected to the driveshaft tube 20 in the same manner as described above and functions in the same manner.

Figure 8:
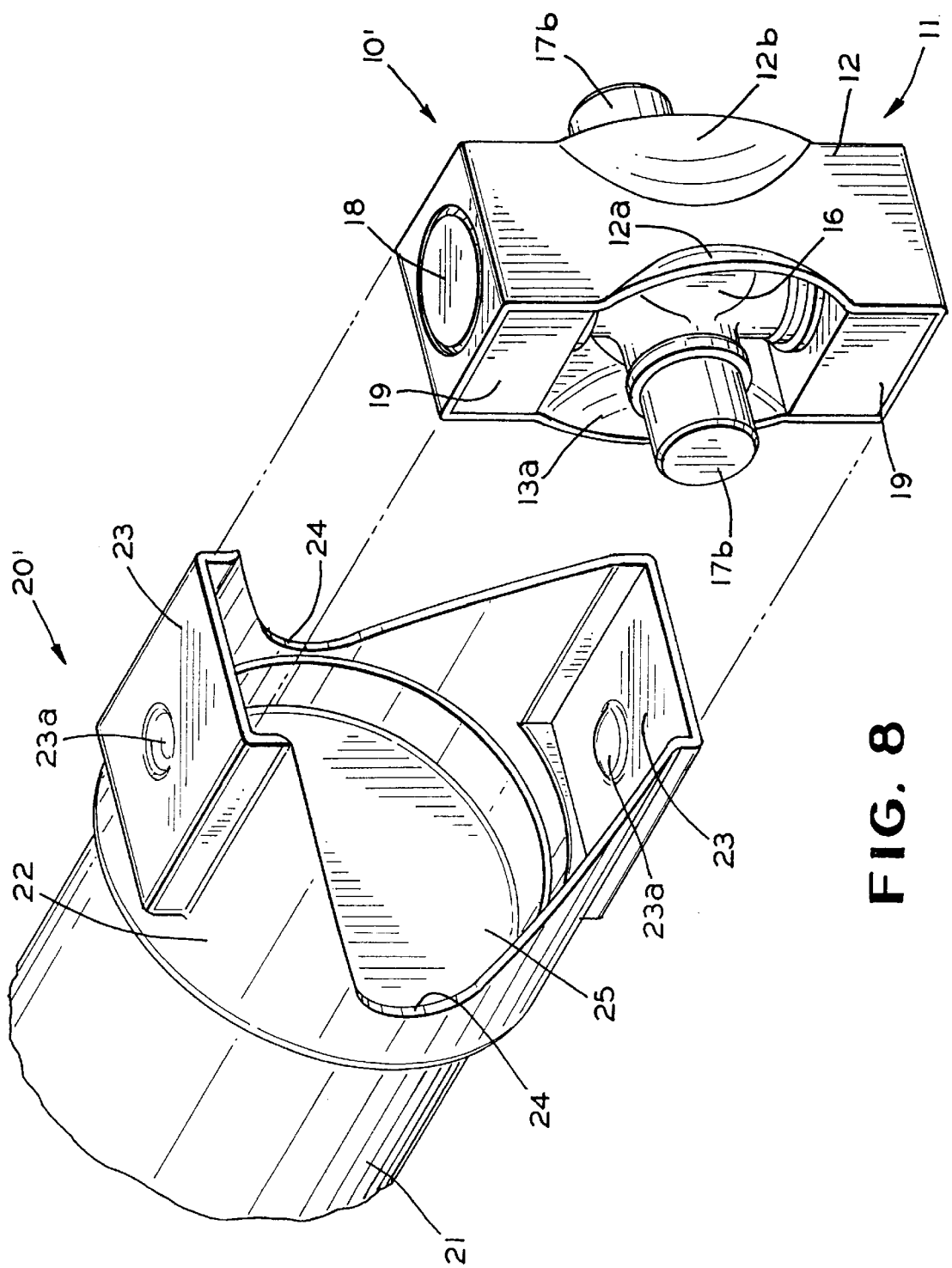
FIG. 8 is an exploded perspective view of a fourth embodiment of a universal joint for use with a modified driveshaft tube in accordance with this invention.
Figure 9:
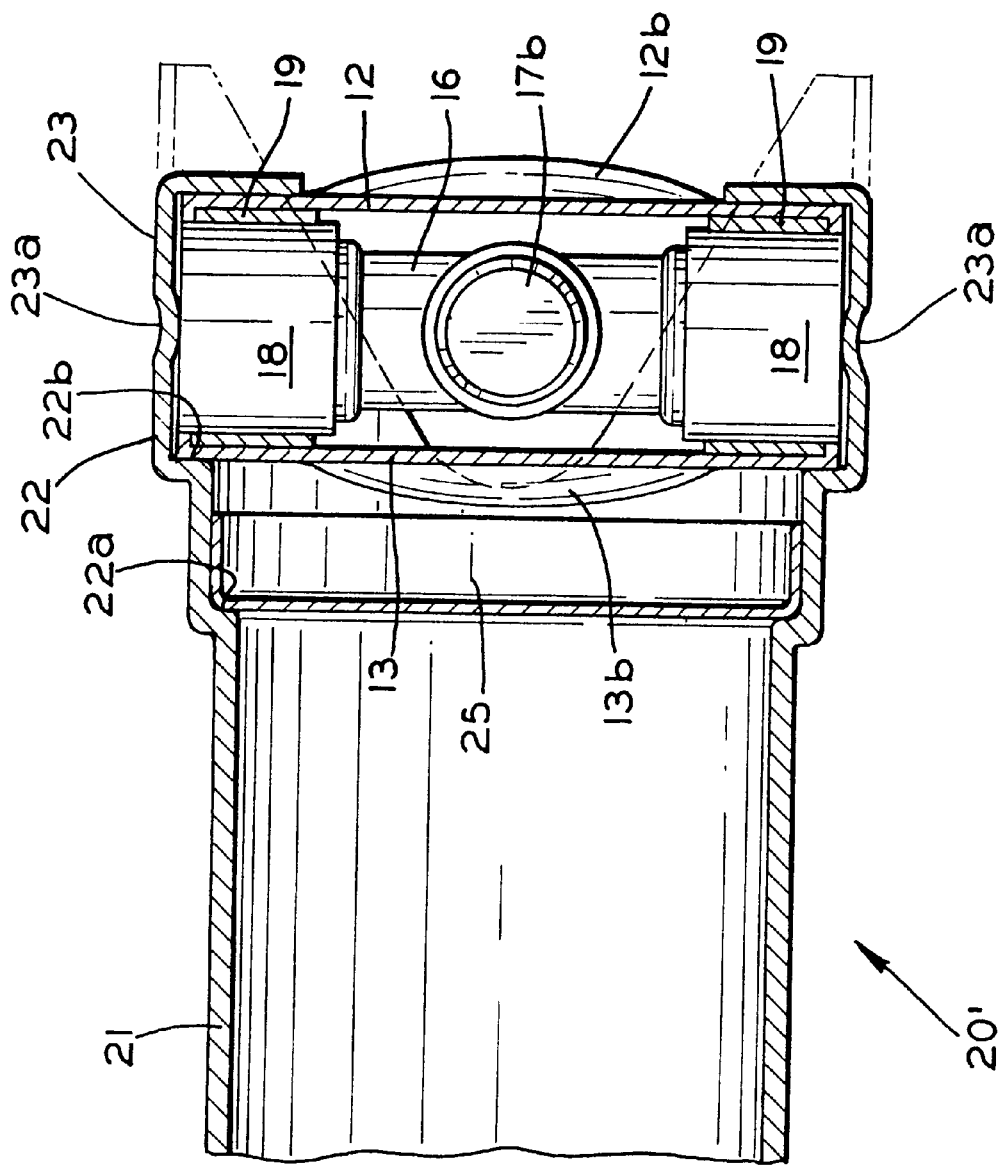
FIG. 9 is sectional elevational view of the universal joint illustrated in FIG. 8 shown assembled with the end of the modified driveshaft tube.

Referring now to FIGS. 8 and 9, there is illustrated a fourth embodiment of a universal joint, indicated generally at 10', for use with a modified driveshaft tube 20' in accordance with this invention. The universal joint 10' is similar to the universal joint 10 described above and illustrated in FIGS. 1, 2, and 3, and like reference numbers are used to indicate identical structures. As described above, the end portion 22 of the driveshaft tube 20' has a pair of axially extending, opposed arms 23 that are defined by a pair of generally V-shaped cut-outs 24. However, each of the arms 23 has an inwardly extending dimple or depression 23a formed therein. When the cross 16 is connected to the driveshaft tube 20' in the manner described above, the dimples 23a resiliently engage the outer end surfaces of the bearing cups 18. As a result, the cross 16 is resiliently supported between the arms 23 of the driveshaft tube 20'. The dimples 23a can be formed by any means, preferably by mechanical deformation, and can be formed either during the manufacture of the driveshaft tube 20' or during the assembly of the cross 16 to the driveshaft tube 20'. In the latter instance, the arms 23 can be slightly spread apart by a fixture or tool (not shown) after the cross 16 has been inserted therebetween, allowing the dimples 23a to be formed by a deformation tool or other means. Similar dimples 23a can be provided in the other embodiments of the invention illustrated in FIGS. 4 through 7.

Figure 10:
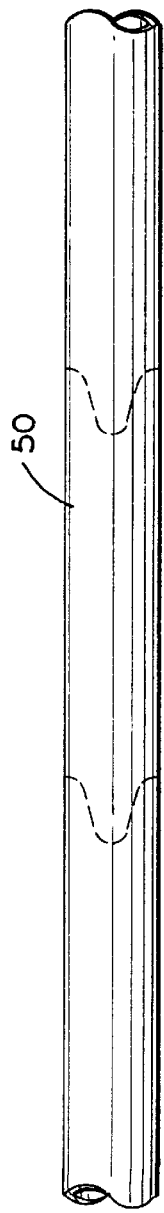
FIGS. 10, 11, and 12 are perspective views showing a method for forming the driveshaft tubes illustrated in FIGS. 2, 3, 5, 7, 8, and 9.
Figure 11:
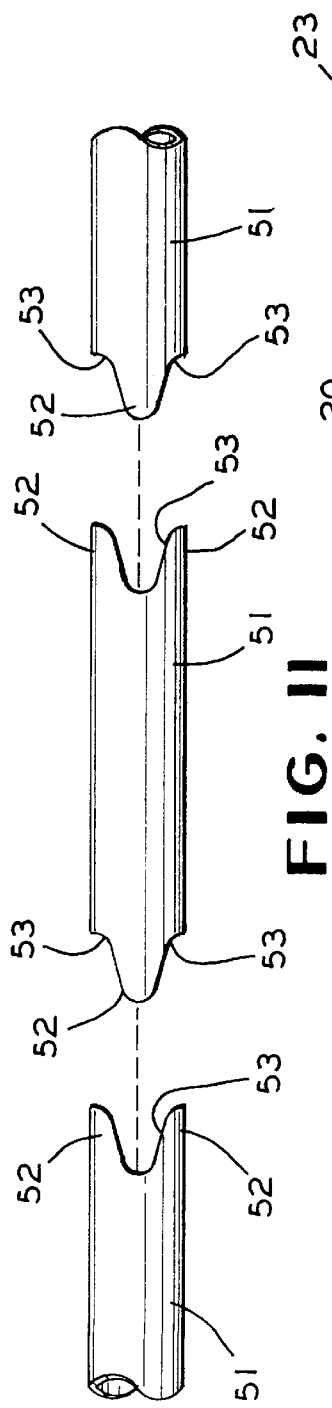
Figure 12:
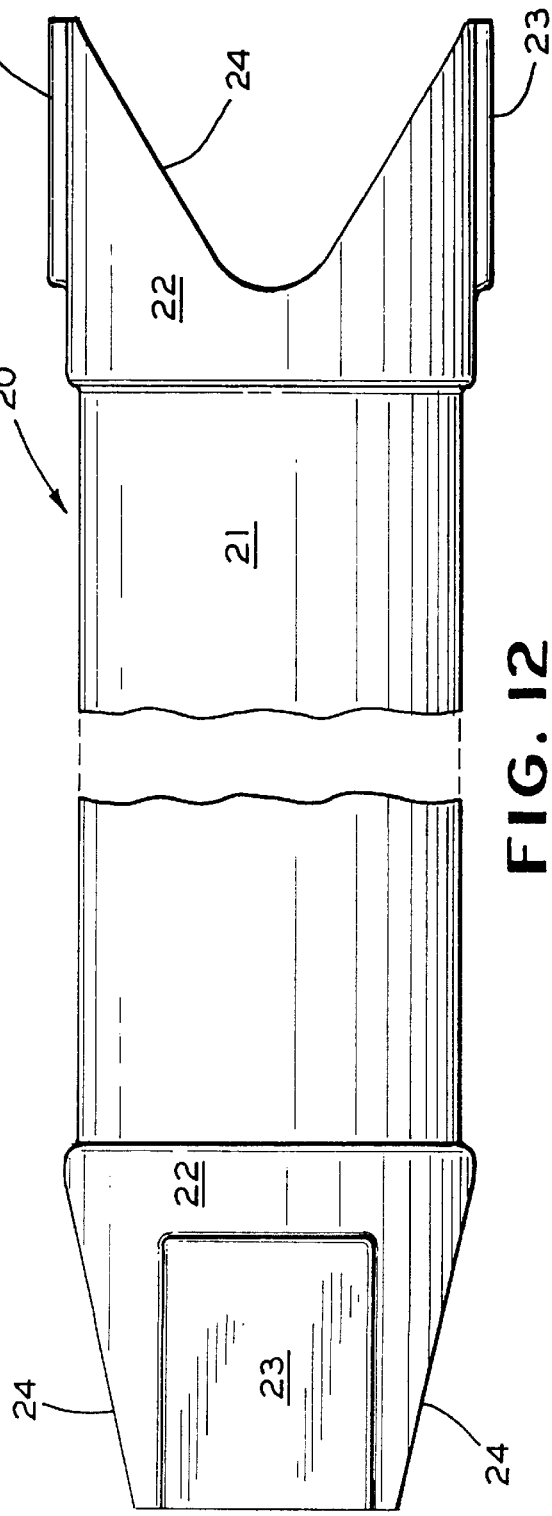

FIGS. 10, 11, and 12 illustrate a method for forming the driveshaft tube 20 in accordance with this invention. Initially, as shown in FIGS. 10 and 11, a length of tube stock 50 is cut into a plurality of individual tube sections 51. Preferably, the cutting of the tube stock 50 is performed on a continuous basis. Regardless, the cutting process is effective to form a pair of protruding portions 52 that are defined by a pair of generally V-shaped cut-out portions 53 on each end of the individual tube sections 51. Thus, the protruding portions 52 and the cut-out portions 53 are preferably shaped in a complementary manner. As a result, a single circumferential cut through the tube stock 50 can form both the protruding portions 52 and the cut-out portions 53 on a leading end of a first individual tube section 51, as well as both the protruding portions 52 and the cut-out portions 53 on an adjacent trailing end of a second individual tube section 51, as shown in FIG. 3. Thereafter, as shown in FIG. 12, each of the individual tube sections 51 is deformed to form the driveshaft tube 20. Specifically, the deformation process is effective to form the enlarged end portions 22 and the inwardly facing channel regions on the opposed arms 23. Also, the dimples 23a described above can be formed at this time. Such deformation can be accomplished by hydroforming, push-pointing, or any other method known in the art.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. A driveshaft tube and universal joint assembly comprising:
   a driveshaft tube including an end portion having a pair of axially extending arms formed integrally therewith; and
   a universal joint assembly connected to said arms of said end of said driveshaft tube, said universal joint assembly including a hollow carrier supported on said arms of said driveshaft tube, a pair of bearing supports supported on said carrier, and a cross including a pair of trunnions having respective bearing cups rotatably mounted thereon, said bearing cups being supported in said bearing supports.

2. The driveshaft tube and universal joint assembly defined in claim 1 wherein said driveshaft tube has an internally stepped shoulder formed therein, and wherein said universal joint assembly abuts said internally stepped shoulder.

3. The driveshaft tube and universal joint assembly defined in claim 1 wherein ends of said arms of said driveshaft tube engage and retain said universal joint assembly with said driveshaft tube.

4. The driveshaft tube and universal joint assembly defined in claim 1 wherein said driveshaft tube has an internally stepped shoulder formed therein, said universal joint assembly abuts said internally stepped shoulder, and ends of said arms of said driveshaft tube engage and retain said universal joint assembly with said driveshaft tube.

5. The driveshaft tube and universal joint assembly defined in claim 1 wherein said arms of said driveshaft tube have respective channels formed therein, and wherein said universal joint assembly is received within said channels.

6. The driveshaft tube and universal joint assembly defined in claim 1 wherein inwardly extending dimples are formed on each of said arms of said driveshaft tube, and wherein said dimples resiliently engage said universal joint assembly.

7. A method of manufacturing a driveshaft tube and universal joint assembly comprising the steps of:
   (a) providing a driveshaft tube including an end portion having a pair of axially extending arms formed integrally therewith; and
   (b) connecting a universal joint assembly to the arms of the end of the driveshaft tube by providing rotatable bearing cups on a pair of trunnions of a cross; supporting the bearing cups in respective bearing supports; supporting the bearing supports on a hollow carrier; and supporting the hollow carrier on the arms of the driveshaft tube.

8. The method defined in claim 7 wherein said step (a) is performed by forming the driveshaft tube with an internally stepped shoulder, and wherein step (b) is performed by moving the universal joint assembly into abutment with the internally stepped shoulder.

9. The method defined in claim 7 wherein step (b) is performed by bending ends of the arms of the driveshaft tube so as to engage and retain the universal joint assembly with the driveshaft tube.

10. The method defined in claim 7 wherein said step (a) is performed by forming the driveshaft tube with an internally stepped shoulder, and wherein step (b) is performed by initially moving the universal joint assembly into abutment with the internally stepped shoulder, then bending ends of the arms of the driveshaft tube so as to engage and retain the universal joint assembly with the driveshaft tube.

11. The method defined in claim 7 wherein said step (a) is performed by forming respective channels in the arms of the driveshaft tube, and wherein said step (b) is performed by disposing the universal joint assembly within the channels.

12. The method defined in claim 7 wherein said step (a) is performed by forming a pair of dimples on each of the arms of the driveshaft tube, and wherein said step (b) is performed by resiliently supporting the universal joint between the dimples.

* * * * *